United States Patent
Guthrie et al.

(10) Patent No.: US 12,204,356 B2
(45) Date of Patent: Jan. 21, 2025

(54) SYSTEM LEVEL OFFSET CALIBRATION OF MULTIPHASE VOLTAGE REGULATOR

(71) Applicant: Renesas Electronics America Inc., Milpitas, CA (US)

(72) Inventors: Travis John Guthrie, Austin, TX (US); Timothy William Nutt, West Lake Hills, TX (US); Aaron Michael Shreeve, Austin, TX (US); Narendra Babu Kayathi, Austin, TX (US); Robert Thomas Grisamore, Austin, TX (US); Kiran Gonsalves, Austin, TX (US)

(73) Assignee: Renesas Electronics America Inc., Milpitas, CA (US)

( * ) Notice: Subject to any disclaimer, the term of this patent is extended or adjusted under 35 U.S.C. 154(b) by 454 days.

(21) Appl. No.: 17/567,066

(22) Filed: Dec. 31, 2021

(65) Prior Publication Data

US 2023/0213954 A1    Jul. 6, 2023

(51) Int. Cl.
*G05F 1/575* (2006.01)
*H02M 1/00* (2007.01)
*H02M 3/156* (2006.01)

(52) U.S. Cl.
CPC .......... *G05F 1/575* (2013.01); *H02M 1/0009* (2021.05); *H02M 3/156* (2013.01)

(58) Field of Classification Search
CPC ..... G05F 1/575; H02M 3/156; H02M 1/0009; H02M 3/1584
See application file for complete search history.

(56) References Cited

U.S. PATENT DOCUMENTS 9,419,627 B2 *   8/2016   Guthrie ................. G01R 19/25

* cited by examiner

*Primary Examiner* — An H Do
(74) *Attorney, Agent, or Firm* — SCULLY, SCOTT, MURPHY & PRESSER, P.C.

(57) ABSTRACT

Methods and systems for operating a voltage regulator are described. An apparatus may receive a feedback signal from a power stage. The feedback signal may be one of a sensed signal measured from an output of the power stage and a calibration signal representing a fixed voltage. The apparatus may convert the feedback signal into a correction signal. The apparatus may further adjust a synthetic current using the correction signal, the synthetic current being associated with the power stage.

19 Claims, 6 Drawing Sheets

SYSTEM LEVEL OFFSET CALIBRATION OF MULTIPHASE VOLTAGE REGULATOR

BACKGROUND

The present disclosure relates in general to operations of power converters. More specifically, the present disclosure relates to auto-calibration that can cancel and/or correct system level offsets in a multiphase voltage regulating system.

DC-to-DC voltage conversion may be performed by switching voltage regulators or power converters to convert a voltage from a higher level to a lower level that may be required by a load. An example architecture may distribute the higher voltage to multiple voltage regulators or power stages, and each voltage regulator may produce a same or different voltages for one or more loads. A switching voltage regulator may use two or more power transistors to convert energy from one voltage to another voltage. One example of such a switching voltage regulator may be a buck regulator, which typically switches a pair of power transistors to produce a square-wave at a common node between the pair of power transistors. The produced square-wave may be smoothed out using a resonant circuit (e.g., an inductor-capacitor (LC) circuit) to produce a desired voltage for a load. A feedback control loop may be configured to control a duty-cycle of the produced square-wave and a resulting value of an output voltage of the voltage converter.

An example voltage regulator architecture may be a multiphase voltage regulator including multiple power stages that produce individual outputs (e.g., pulse-width modulation (PWM) outputs), with individual pairs of power transistors (e.g., field-effect transistors (FET)) and inductors. Each one of the multiple power stages may include a controller, may output a voltage, and may include input pins to receive current and voltage being sensed at the outputs. The sensed voltage and current may be used for various offset compensations or calibrations, such as auto-zero and auto-gain calibrations.

SUMMARY

In an embodiment, an apparatus for voltage regulation is generally described. The apparatus may include a controller configured to receive a feedback signal from a power stage. The feedback signal may be one of a sensed signal measured from an output of the power stage and a calibration signal representing a fixed voltage. The controller may be further configured to convert the feedback signal into a correction signal. The controller may be further configured to adjust a synthetic current using the correction signal, the synthetic current being associated with the power stage.

In an embodiment, an apparatus for voltage regulation is generally described. The apparatus may include a voltage converter and a circuit coupled to the voltage converter. The circuit may be configured to receive a sensed signal from the voltage converter. The circuit may be further configured to receive a command from a controller. The circuit may be further configured to in response to the command being a request to switch on an amplification mode, amplify the sensed signal, and send the amplified sensed signal to the controller. The circuit may be further configured to in response to the command being a request to switch on a calibration mode, output a fixed voltage to the controller.

In an embodiment, a method for operating a voltage regulator is generally described. The method may include receiving a feedback signal from a power stage. The feedback signal may be one of a sensed signal measured from an output of the power stage and a calibration signal representing a fixed voltage. The method may further include converting the feedback signal into a correction signal. The method may further include adjusting a synthetic current using the correction signal, the synthetic current being associated with the power stage.

Further features as well as the structure and operation of various embodiments are described in detail below with reference to the accompanying drawings. In the drawings, like reference numbers indicate identical or functionally similar elements.

DETAILED DESCRIPTION

In an example, a current measured from an inductor connected to an output of a power stage of a multiphase regulator may be fed back to the power stage for controlling or adjusting various functions. For example, functions such as voltage accuracy, transient response, current balance, and circuit fault protection, may be adjusted based on information that can be extracted from the inductor current. In an example, a synthetic current may be generated using known system parameters, and the synthetic current may be compared with the measured inductor current. A result of the comparison may be used for adjusting a pulse-width modulation (PWM) signal being used for controlling the power stages. The adjustment to the PWM signal may include, for example, adjusting a duty cycle of the PWM signal. The adjustment to the PWM signal may effectively calibrate the voltages being outputted from the power stages, such as canceling offsets and correcting gain errors.

In an example, a multiphase controller connected to the multiple power stages in a multiphase voltage regulator may be sensitive to errors in the inductor current supplied by the multiple power stages. To address these errors, each power stage, and the multiphase controller itself, may include its own circuitry to perform calibrations such as auto-gain and auto-zero calibrations on components that process the measured inductor current. For example, the power stages may include circuitry to calibrate amplifiers within the power stages, and the multiphase controller may include circuitry to calibrate analog-to-digital converters (ADC). Therefore, the multiphase controller and each one of the power stages may perform its own calibration. Since the multiphase controller and each one of the power stages perform its own calibration to cancel offsets or to correct gains, the results from these individual calibrations may create individual residual offset that can be accumulated into a system level offset. For example, a power stage that calibrated its own amplifier may output a calibrated signal to the multiphase controller, and the multiphase controller needs to perform calibration on its own ADC when processing the calibrated signal from the power stage, resulting in more than one level of distinct calibration. To be described in more detail below, the methods and systems described herein may provide system level auto-calibration while the system is in use, which may provide high accuracy performance across operating conditions. Circuits integrated in the multiphase controller and the power stages may communicate with one another to perform system level auto-calibrations to provide system level offset cancellation and gain correction.

Figure 1:
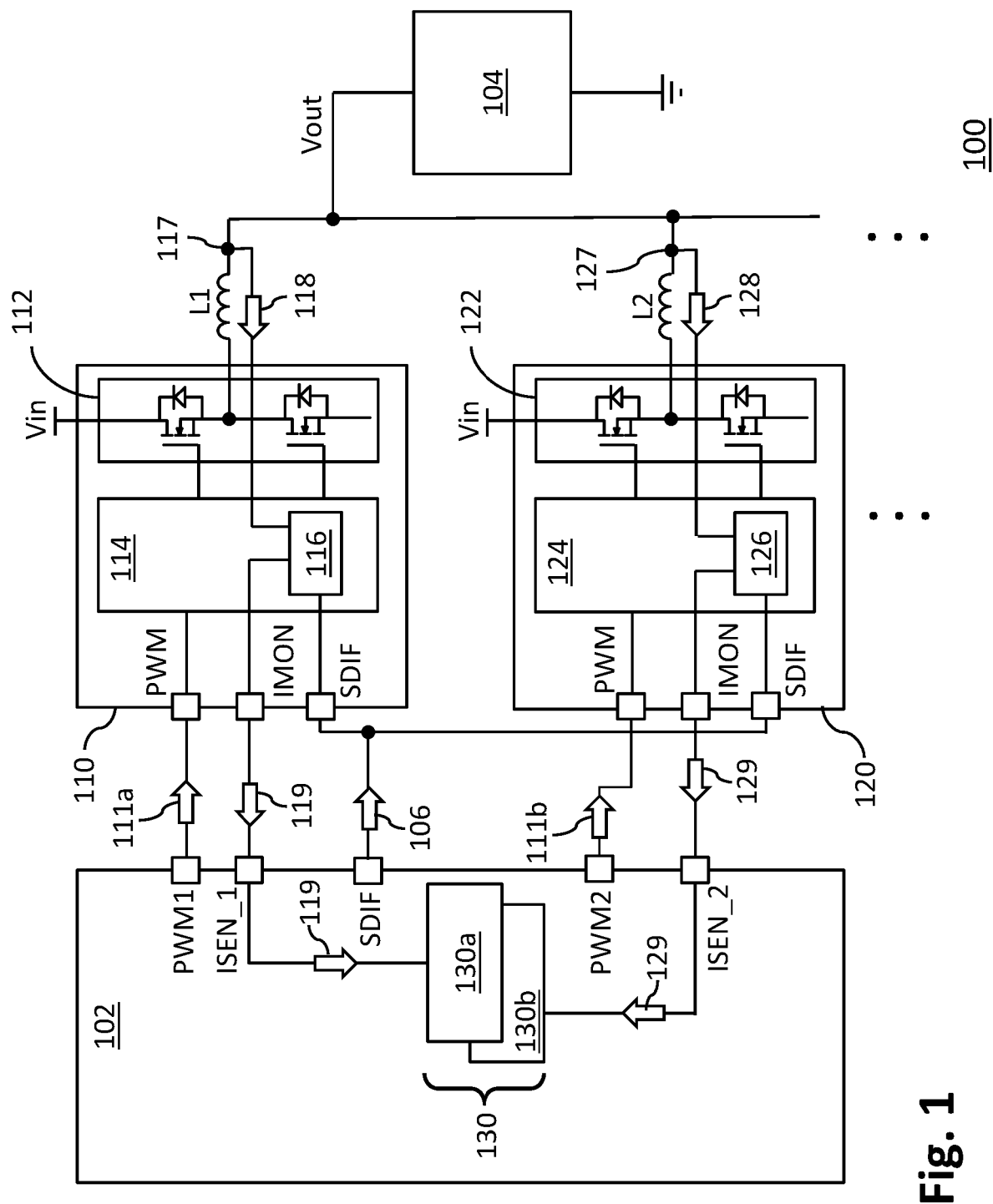
FIG. 1 is a diagram showing an example system that can implement system level offset calibration of multiphase voltage regulator in one embodiment.

FIG. 1 is a diagram showing an example system 100 that can implement system level offset calibration of multiphase voltage regulator in one embodiment. The system 100 may be an apparatus implementing a multiphase voltage regulator including a controller 102 and at least one voltage regulators or power stages, such as a power stage 110 and a power stage 120. In an example, the controller 102 may be a multiphase controller and the power stages 110, 120 may be DC-DC converters. The controller 102 may be configured to control the power stages 110, 120 using a pulse width modulation (PWM) signals 111a, 111b, respectively. The PWM signals 111a, 111b may be outputted from PWM1, PWM2 output pins of the controller 102 to PWM input pins of the power stages 110, 120, respectively. The power stages 110, 120 may be current-sourced devices, voltage-sourced devices, or a device implementing both current and voltage-sourced control. In an example, the power stages 110, 120 may be smart power stage (SPS) devices configured to perform voltage regulation with additional features such as feedback control based on feedback voltage and/or feedback current measured at the outputs of each power stage in the system 100.

The power stage 110 may include a power transistor pair 112 and a power stage controller 114. The power transistor pair 112 may include a high side field-effect transistor (FET) and a low side FET. The power stage 120 may include a power transistor pair 122 and a power stage controller 124. The power transistor pair 122 may include a high side FET and a low side FET. The PWM signals 111a and 111b may be control signals that can switch the power transistor pairs 112 and 122, respectively, to convert an input voltage Vin into an output voltage Vout that may be supplied to a load 104.

The power stage controller 114 may include a circuit 116 configured to receive commands from the controller 102 for performing auto-calibration for the system 100. In an example, the circuit 116 may include one or more switches that may be switched to modes, such as switching among a normal operating (or amplification) mode, auto-gain calibration mode, and auto-zero calibration mode. The power stage controller 124 may include a circuit 126 configured to receive commands from the controller 102 for performing auto-calibration for the system 100. The circuits 116, 126 may be integrated circuits having identical components and functionalities. In an example, the circuit 126 may include one or more switches that may be switched to different modes, such as switching between a normal operating (or amplification) mode, auto-gain calibration mode, and auto-zero calibration mode.

In an example, a firmware block of the controller 102 may send a command 106 to the power stages 110, 120, to command the circuits 116, 126, to switch on or off specific operation and/or calibration modes. In an example, the controller 102 may send the command 106 to the power stages 110, 120 via a shared digital bus interface (SDIF) pin. In an example, the command 106 may be a clock signal, and the circuits 116, 126 may be configured to detect clock edges in the command 106 to switch on and/or off specific operation and/or calibration modes.

The controller 102 may include one or more copies of a circuit 130 (e.g., circuits 130a, 130b), where each copy of the circuit 130 can be connected to one power stage. For example, the circuit 130a can be connected to the power stage 110 and the circuit 130b can be connected to the power stage 120. The circuits 130a, 130b can include identical components. The circuits 130a, 130b can be configured to receive feedback signals from a connected power stage, such as the power stages 110, 120. For example, the power stage 110 may measure a current or voltage at a node 117 (or measured directly from the inductor L1), and the measured current or voltage may be fed back to the circuit 116 as a sensed signal 118. The sensed signal 118 may be a current signal (e.g., a sensed current representing an inductor current of an inductor L1) or a voltage signal (e.g., voltage across the inductor L1). The circuit 116 may generate a feedback signal 119 based on an operation mode and/or calibration mode being switched on or off in the circuit 116. For example, the feedback signal 119 may be an amplified version of one of: 1) the sensed signal 118, 2) a first calibration signal having a first fixed voltage (or a fixed current) representative of an input offset voltage of the power stage 110, and 3) a second calibration signal having a second fixed voltage (or fixed current) representative of a gain of the power stage 110. If an auto-zero calibration mode is switched on in the circuit 116, then the feedback signal 119 may be an amplified version of the first calibration signal. If an auto-gain calibration mode is switched on in the circuit 116, then the feedback signal 119 may be an amplified version of the second calibration signal. If both auto-zero and auto-gain calibration modes are switched off, and an amplification mode (or a normal operation mode) of the power stage 110 is maintained or switched on, and the feedback signal 119 may be the amplified version of the sensed signal 118. The circuit 116 may send the feedback signal 119 to the circuit 130 of the controller 102 via an IMON pin of the power stage 110.

The power stage 120 may measure a current or voltage at a node 127 (or measured directly from the inductor L2), and the measured current or voltage may be fed back to the circuit 126 as a sensed signal 128. The sensed signal 128 may be a current signal (e.g., a sensed current representing an inductor current of an inductor L2) or a voltage signal (e.g., voltage across the inductor L2). The circuit 126 may generate a feedback signal 129 based on an operation mode and/or calibration mode being switched on or off in the circuit 126. For example, the feedback signal 129 may be an amplified version of one of: 1) the sensed signal 128, 2) a first calibration signal having a first fixed voltage (or a fixed current) representative of an input offset voltage of the power stage 120, and 3) a second calibration signal having a second fixed voltage (or fixed current) representative of a gain of the power stage 120. If an auto-zero calibration mode is switched on in the circuit 126, then the feedback signal 129 may be an amplified version of the first calibration signal. If an auto-gain calibration mode is switched on in the circuit 126, then the feedback signal 129 may be an amplified version of the second calibration signal. If both auto-zero and auto-gain calibration modes are switched off, and an amplification mode (or a normal operation mode) of the power stage 120 is maintained or switched on, and the feedback signal 129 may be the amplified version of the sensed signal 128. The circuit 126 may send the feedback signal 129 to the circuit 130 of the controller 102 via an IMON pin of the power stage 120. The power stages 110, 120, may have different input offset voltage values and gain values from one another.

The circuits 130a, 130b may receive the feedback signals 119, 129 from the power stages 110, 120, respectively. If the feedback signal 119 is an amplified version of the sensed signal 118, the circuit 130a may use the feedback signal 119 to correct a synthetic current being generated by a current synthesizer that may be a part of the circuit 130a (see FIG. 2). If the feedback signal 129 is an amplified version of the sensed signal 128, the circuit 130b may use the feedback signal 129 to correct a synthetic current being generated by a current synthesizer that may be a part of the circuit 130b. The circuits 130a, 130b can individually correct their own synthetic current to compensate or correct the sensed current or sensed voltage (e.g., sensed signals 118, 128) being received (e.g., in future instances) at their respective ISEN pins.

In an example, in response to the feedback signal 119 being a calibration signal representing either an input offset voltage or a gain of the power stage 110, the circuit 130a may adjust or correct the synthetic current being generated within the circuit 130a using a fixed value indicated by the feedback signal 119. In an example, if the calibration signal (e.g., the feedback signal 119) is the first calibration signal representing an input offset voltage of the power stage 110, the circuit 130a may perform an auto-zero calibration to remove or cancel offsets that may be present in the signal being received at the ISEN_1 pin (e.g., future instances of sensed signal 118). If the calibration signal (e.g., the feedback signal 119) is the second calibration signal representing the gain of the power stage 110, the circuit 130a may perform an auto-gain calibration to perform gain correction on the signal being received at the ISEN_1 pin (e.g., future instances of sensed signal 118). The circuit 130a can correct the synthetic current being generated within the circuit 130a using the auto-zero or auto-gain calibrated sensed signal.

In an example, in response to the feedback signal 129 being a calibration signal representing either an input offset voltage or a gain of the power stage 120, the circuit 130b may adjust or correct the synthetic current being generated within the circuit 130b using a fixed value indicated by the feedback signal 129. In an example, if the calibration signal (e.g., the feedback signal 129) is the first calibration signal representing an input offset voltage of the power stage 120, the circuit 130b may perform an auto-zero calibration to remove or cancel offsets that may be present in the signal being received at the ISEN_2 pin (e.g., future instances of sensed signal 128). If the calibration signal (e.g., the feedback signal 129) is the second calibration signal representing the gain of the power stage 120, the circuit 130b may perform an auto-gain calibration to perform gain correction on the signal being received at the ISEN_2 pin (e.g., future instances of sensed signal 128). The circuit 130b can correct the synthetic current being generated within the circuit 130b using the auto-zero or auto-gain calibrated sensed signal. In one embodiment, the corrected synthetic current from circuits 130a, 130b (and other copies of circuit 130 connected to other power stage) can be combined by the controller 102 into a correction signal. This correction signal can be provided to a PWM generator to correct or adjust the PWM signal 111, such as by adjusting a duty cycle of the PWM signal 111. Changes to the duty cycle of the PWM signals 111a, 111b can change the amount of voltage being outputted by the power stages 110, 120, effectively changing Vout as well.

In an example, the circuits 130a, 130b may store the feedback signals 119, 129 in a memory device of the controller 102. The circuits 130a, 130b may use the stored feedback signals 119, 129 to scale and/or correct the sensed signals 118, 128, as described above. Further, by using a shared digital bus (e.g., SDIF) to issue the command 106, the controller 102 may issue the command 106 to the power stages 110, 120 during normal operation of the system 100 without interfering with other signals being exchanged between the controller 102 and the power stages 110, 120 using other communication buses. Therefore, the controller 102 may send the command 106 to the power stages 110, 120 periodically to request auto-zero and/or auto-gain calibration during normal operation of the system 100. In an example, the sensed signals 118, 128 being measured at nodes 117, 127 may vary due to temperature and/or process variations. The changes to the sensed signals 118, 128 may indicate the output voltage Vout is changing as well. By being able to request auto-zero and/or auto-gain calibration during normal operation of the system 100, changes to Vout may be mitigated more frequently instead of having to wait for the system 100 to idle and perform calibrations. Thus, the system 100 may provide relatively more accurate output voltage to the load 104.

Figure 2:
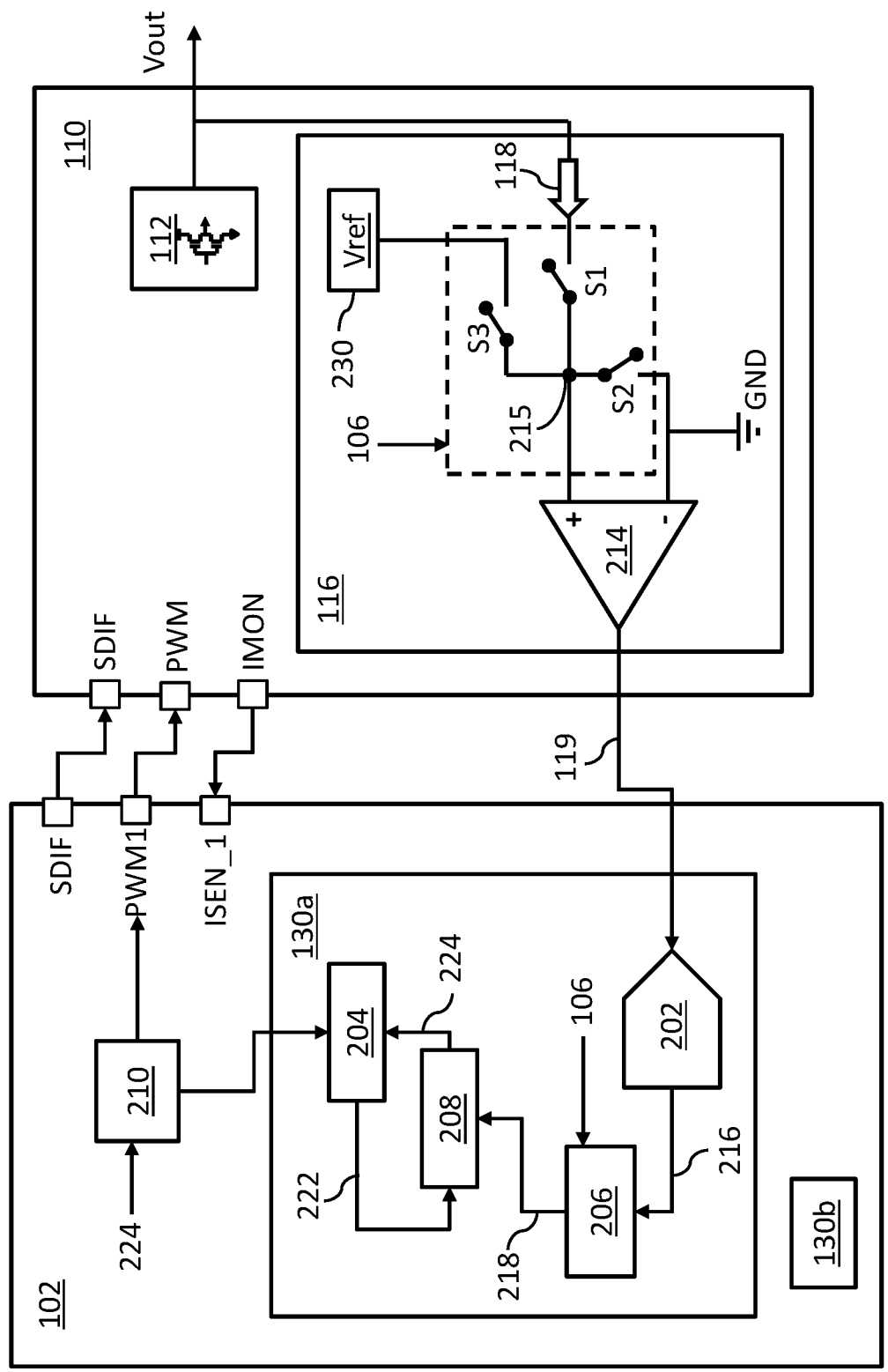
FIG. 2 is a diagram showing details of the example system of FIG. 1 in one embodiment.

FIG. 2 is a diagram showing details of the example system 100 of FIG. 1 in one embodiment. The descriptions relating to the circuit 130a shown in FIG. 2 is also applicable to the circuit 130b, the descriptions relating to the power stage 110 shown in FIG. 2 is also applicable to the power stage 120, and the descriptions relating to the circuit 116 shown in FIG. 2 is also applicable to the circuit 126 (see FIG. 1). In the example shown in FIG. 2, the circuit 130a may include an analog-to-digital converters (ADC) 202, a current synthesizer 204, a correction circuit 206, a proportional-integral-derivative (PID) controller 208, and a PWM modulator 210. The circuit 130b can include the same components as the circuit 130a. The current synthesizer 204 can be controlled by the PWM signal 111a and be synchronous with the power stage 110. The circuit 116 may include switches S1, S2, S3, and an amplifier 214. The circuit 126 of the power stage 120 (see FIG. 1) can include switches S1, S2, S3 as well. An input of the ADC 202 may be connected to an output of the amplifier 214 or the circuit 116. The ADC 202 may be configured to receive the feedback signal 119 from the circuit 116 of the power stage 110 (see FIG. 1). The controller 102 can be configured to send the command 106 to the circuits 130a, 130b, and to the power stages 110, 120. In an example, a firmware can generate and send the command 106 to the circuits 130a, 130b, and the power stages 110, 120. The switches S1, S2 in the power stages 110, 120, and switches in the circuits 130a, 130b (shown in FIG. 4) can be selectively switch on or switched off depending on a power stage address and calibration mode specified by the command 106 (to be described in FIG. 5).

The switch S1 may be connected between an input terminal of the circuit 116 and a non-inverting input terminal ("+") of the amplifier 214. The switch S2 may be connected between a ground terminal ("GND") and a node 215, where the node 215 is between the switch S1 and the non-inverting input terminal ("+") of the amplifier 214. The switch S3 may be connected between the node 215 and a voltage source 230 configured to supply a reference voltage Vref. In an example, in response to the switch S1 being closed or switched on, and the switches S2, S3 being opened or switched off, the circuit 116 may operate in a normal operation mode or an amplification mode. In the amplification mode, the sensed signal 118 may be received by the non-inverting input terminal of the amplifier 214. The amplifier 214 may amplify the sensed signal 118 to generate the feedback signal 119.

In an example, in response to the switch S2 being closed or switched on, and the switches S1, S3 being opened or switched off, the circuit 116 may operate in an auto-zero mode. In the auto-zero mode, the sensed signal 118 may not be received by the amplifier 214. The closed switch S2 may short the inputs of the amplifier 214 to a zero value such as the ground terminal GND. As a result of shorting the inputs of the amplifier 214 to GND, the amplifier 214 may output the feedback signal 119 as a first calibration signal representing an input offset voltage of the amplifier 214, where the input offset voltage may be a fixed value. However, input offset voltage being outputted by the amplifier 214 may be inaccurate due to various factors such as, for example, process and temperature variation. In an example, under an ideal situation, shorting the inputs of the amplifier 214 to GND should cause the feedback signal 119 to represent zero. However, due to the variations of the amplifier 214, the feedback signal 119 may represent a nonzero value different from zero and close to zero, such as, for example, 0.2 microvolts ($\mu V$), etc. Thus, closing the switch S2 may cause the amplifier 214 to output an input offset voltage of the amplifier 214.

In an example, in response to the switch S3 being closed or switched on, and the switches S1, S2 being opened or switched off, the circuit 116 may operate in an auto-gain mode. In the auto-gain mode, the sensed signal 118 may not be received by the amplifier 214. The closed switch S3 may connect the voltage supply 230 to the amplifier 214, such that the voltage supply 230 may provide a reference voltage Vref to the amplifier 214. As a result of supplying Vref to the amplifier 214, the amplifier 214 may output the feedback signal 119 as a second calibration signal representing a gain of the amplifier 214, where the outputted gain may be a fixed value. However, this gain may be inaccurate due to various factors such as, for example, process and temperature variation. In an example, if the amplifier 214 is an amplifier configured to amplify a signal ten times, then under an ideal situation, the feedback signal 119 should represent 10 Vref. However, due to the variations of the amplifier 214, the feedback signal 119 may represent a value different from 10 Vref, such as, for example, 10.2 Vref, or 9.9 Vref, etc. Thus, closing the switch S3 may cause the amplifier 214 to output a gain of the amplifier 214 as the second fixed value.

The current synthesizer 204 may be configured to generate a sampled current 222 using known parameters of the system 100 and feedback sensed current or sensed voltage from individual power stages. For example, the current synthesizer 204 may be configured to generate the sampled current 222 using known parameters of the system 100 and sensed currents or sensed voltages received from power stages 110, 120, and other power stages connected to the controller 102. Example of known parameters that may be used by the current synthesizer may include, for example, resistor loss, diode parameters, input voltage Vin, output voltage Vout, etc.

In an example, the circuit 130 may implement a digital droop (e.g., a current feedback scheme) to continuously correct and adjust a synthetic current 224 using the sample current 222 and feedback current and/or voltages from the power stage 110. For example, the ADC 202 may sample the sensed signal 118 received by the controller 102, and convert the samples to digital signals 216 representative of the sensed signal 118. The digital signals 216 can represent either the sensed signal 118, the input offset voltage (e.g., a logic low, or zero voltage) or the gain of the power stage 110 (e.g., logic high, or a non-zero voltage such as 5 millivolts (mV)), depending on the calibration mode being switched on or switched off in the circuits 116, 130. The digital signals 216 can undergo noise filtering by the correction circuit 206 to output filtered signals 218, and the filtered signal 218 can be provided to the PID controller 208.

In an example, the sample current 222 can be a synthetic current that is sampled and looped internally within the circuit 130a (e.g., between the PID controller 208 and the current synthesizer 204) for feedback control purposes. The PID controller 208 can receive the sample current 222 from the current synthesizer 204. The PID controller 208 may multiply and sum the filtered signals 218 with the sample current 222 to correct and adjust an offset and a slope of the sample current 222. The sample current 222 with the adjustment can be outputted as a synthetic current 224. In an example, the controller 102 can measure the synthetic current 224 from an output terminal of the current synthesizer 204. In an example, if the feedback signal 119 received by the controller 102 is the sensed signals 118, then the current synthesizer 204 may correct or adjust the sample current 222 using the received sensed signal 118. If the feedback signal 119 received by the controller 102 is a calibration signal representing either an input offset voltage or a gain of the power stage 110, the controller 102 may use the calibration signal to perform offset or gain calibration on the sample current 222. The controller 102 may provide the synthetic current 224 to the PWM modulator 210. PWM modulator 210 may combine the synthetic current 224 with other synthetic currents generated by other circuits connected to other power stages, and may output a correction signal to adjust the duty cycle of the PWM signal 111a using the combined synthetic currents.

In one embodiment, the corrections being performed on the output of the current synthesizer 204 of the circuit 130a may affect both the PWM signal 111a for the power stage 110, and also affect the PWM signals for other power stages, such as PWM signal 111b. A sum of the synthetic currents 224 from all power stages may be fed back to the circuit 130a (and other copies of circuit 130 that are connected to respective power stages, such as 130b). The sum of the synthetic currents 224 may be used by the various applications to determine performance parameters, and may be used for determining target currents (e.g., a desired current waveform) for all PWM modulators corresponding to all power stages. For example, The PWM modulator 210 in the circuit 130a may use the synthetic current 224 and a waveform of the target current to determine when to start or stop the PWM signal 111a. PWM modulators in other copies of the circuit 130 may use their own synthetic current and the same target waveform to determine when to start or stop their PWM signal. Therefore, the synthetic currents being outputted by one copy of the circuit 130 (e.g., circuit 130a) can be used for adjusting its own PWM signal, and also PWM signals for other power stages.

In response to the calibration signal (e.g., the feedback signal 119) being an input offset voltage of the power stage 110, the adjustment to the duty cycle of the PWM signal 111a may effectively perform an auto-zero calibration on the power stage 110. In response to the calibration signal (e.g., the feedback signal 119) being a gain of the power stage 110, the adjustment to the duty cycle of the PWM signal 111a may effectively perform an auto-gain calibration on the power stage 110. In an example, the power stages connected to the controller 102 may be auto-zero calibrated, or auto-gain calibrated, in a sequential manner to minimize information loss in response to the current synthesizer stopping generation of the sample current 222. For example, in a first time (e.g., clock cycle), the controller 102 may switch on the switch S2 of the power stage 110 and switch off the switch S2 in the power stage 120 to activate auto-zero calibration mode of the power stage 110 and maintain an amplification mode of the power stage 120. In a second clock cycle, the controller 102 may switch on the switch S1 to activate auto-zero calibration mode of the power stage 120 and switch off the switch S2 in the power stage 110 to maintain the amplification mode of the power stage 110. Further, the sequential activation of calibration modes may be performed by the controller 102 continuously during normal operation of the system 100. In an example, the current synthesizer 204 may be configured to continue operating under normal conditions (e.g., estimating the sample current 222 using known parameters) without receiving any sensed signals. Therefore, the controller 102 may request one or more power stages to output calibration signals, instead of sensed signal, periodically. By performing calibration on one or more power stages sequentially and continuously, the system 100 may be calibrated at the system level instead of individually calibrated power stages and controller.

Figure 3:
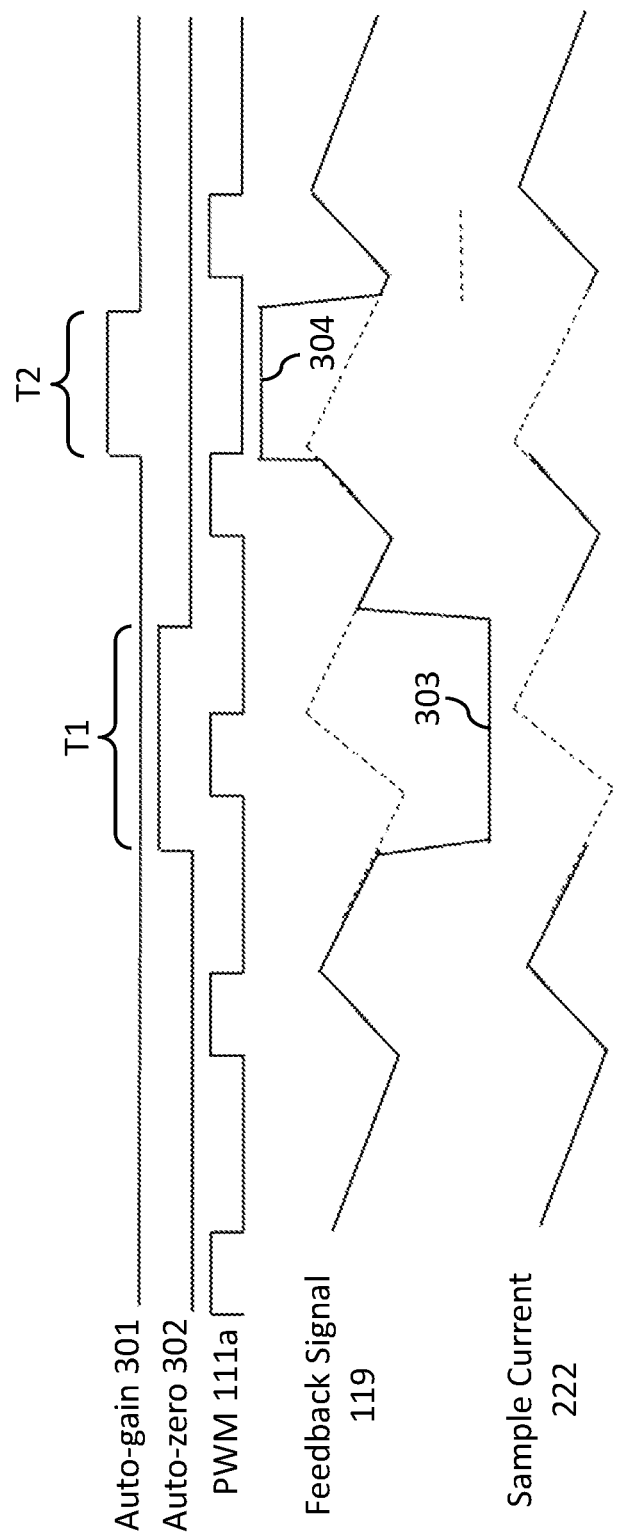
FIG. 3 is a diagram showing a timing diagram of an example implementation of system level offset calibration of multiphase voltage regulator in one embodiment.

FIG. 3 is a diagram showing a timing diagram of an example implementation of system level offset calibration of multiphase voltage regulator in one embodiment. The timing diagram shown in FIG. 3 corresponds to the power stage 110 shown in FIG. 1. In an example shown in FIG. 3, an auto-zero signal 302 may be issued by the command 106 (see FIG. 1) during a time period T1. In response to the auto-zero signal 302 being logic high, the switch S2 (see FIG. 2) may be closed to cause the circuit 116 or the power stage 110 to operate under auto-zero calibration mode. In response to the circuit 116 or the power stage 110 operating under auto-zero calibration mode, the feedback signal 119 may be a calibration signal having a fixed value 303.

In another example, an auto-gain signal 301 may be issued by the command 106 (see FIG. 1) during a time period T2. In response to the auto-gain signal 301 being logic high, the switch S3 (see FIG. 2) may be closed to cause the circuit 116 or the power stage 110 to operate under auto-gain calibration mode. In response to the circuit 116 or the power stage 110 operating under auto-gain calibration mode, the feedback signal 119 may be a calibration signal having a fixed value 304. Note that regardless of the value of the PWM signal 111, the feedback signal 119 may be forced to the fixed value 303 or fixed value 304 depending on the auto-calibration signals (e.g., 301 or 302) issued by the command 106.

In response to the feedback signal 119 being the fixed value 303 or the fixed value 304, the sample current 222 generated by the current synthesizer 204 (see FIG. 2) may not be dependent on the feedback signal 119 (as indicated by the dotted line). If both the auto-gain signal 301 and the auto-zero signal 302 are logic low, then the feedback signal 119 may represent the sensed signal 118 (see FIG. 1 and FIG. 2) and the sample current 222 may be generated based on the sensed signal 118.

Figure 4:
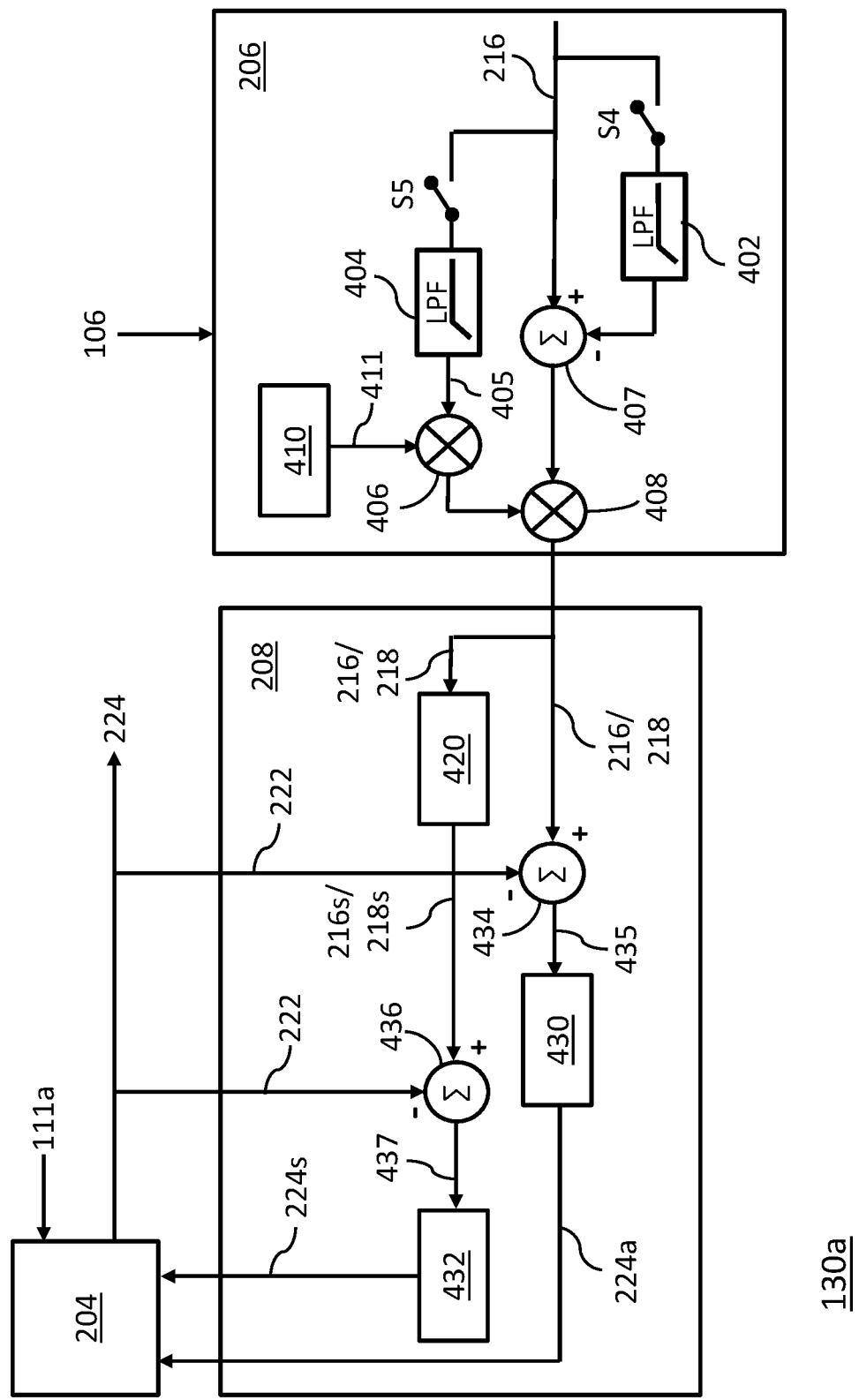
FIG. 4 is a diagram showing details of a multiphase controller that can implement system level offset calibration of multiphase voltage regulator in one embodiment.

FIG. 4 is a diagram showing details of a multiphase controller that can implement system level offset calibration of multiphase voltage regulator in one embodiment. The correction circuit 206 of the circuit 130a can include a switch S4, a switch S5, a low pass filter (LPF) 402, a LPF 404, and a gain correction circuit 410. The correction circuit 206 can receive the command 106 from the controller 102, where the command 106 can switch on or switch off switches S4, S5. The switch S4 can be connected between an input terminal of the correction circuit 206 (e.g., where digital signals 216 is received form the ADC 202) and the LPF 402. The switch S5 can be connected between an input terminal of the correction circuit 206 (e.g., where digital signals 216 is received from the ADC 202) and the LPF 404. The switch S4 can be switched on simultaneously with the switch S1 of the circuit 116 (see FIG. 2), and switch S5 can be switched on simultaneously with the switch S2 of the circuit 116 (see FIG. 2).

In response to the digital signals 216 being sampled digital values of the first fixed value (e.g. fixed value 303 in FIG. 3), the switch S4 being switched on, and the switch S5 being switched off, the digital signals 216 can be filtered by the LPF 402 to output a difference signal 403. The difference signal 403 can be a difference between the digital signals 216 and the first fixed value indicated by the feedback signal 119. In an example, the difference signal 403 can indicate an amount of noise that may have been added to the feedback signal 119 during the sampling performed by the ADC 202 (e.g., difference between input of ADC 202 and output of ADC 202). The difference signal 403 can be subtracted from the digital signals 216 at the summation node 407. In response to the digital signals 216 being sampled digital values of the second fixed value (e.g. fixed value 304 in FIG. 3), the switch S5 being switched on, and the switch S4 being switched off, the digital signals 216 can be filtered by the LPF 404 to output a difference signal 405. The difference signal 405 can be a difference between the digital signals 216 and the second fixed value indicated by the feedback signal 119. In an example, the difference signal 405 can indicate an amount of noise that may have been added to the feedback signal 119 during the sampling performed by the ADC 202 (e.g., difference between input of ADC 202 and output of ADC 202). The difference signal 405 can be multiplied with a gain correction signal 411 being outputted from the gain correction circuit 410 at a multiplication node 406. The gain correction signal 411 can be a signal that corrects a gain error of the ADC 202. The result from the multiplication node 406 can be further combined or multiplied with the digital signals 216 at a multiplication node 408. The result being outputted from the multiplication node 408 can be the filtered signals 218.

The PID controller 208 of the circuit 130a can include a slope calculation circuit 420, an offset correction circuit 430, and a slope correction circuit 432. The filtered signal 218 can be inputted into the slope calculation circuit 420. The slope calculation circuit 420 can determine a slope 218s of a waveform of the filtered signal 218. At a summation node 436, the slope 218s can be combined or summed with a slope of the sample current 222 being looped between the PID controller 208 and the current synthesizer 204. The summation node 436 can output a slope correction signal 437 to the slope correction circuit 432. The slope correction signal 437 can be a difference between the slope 218s of the filtered signal 218 and the slope of the sample current 222. The slope correction circuit 432 can perform proportional integral (PI) correction on the slope correction signal 437 to generate a slope 224s, where the slope 224s can be a new slope value of the sample current 222.

The generation of fixed value signals under the auto-zero or auto-gain calibration modes by circuit 116 in the power stage 110 (see FIG. 2), and the filtering and/or correction performed on the fixed value signals by the correction circuit 206, can allow the system 100 to perform system level auto-zero or auto-gain calibrations. For example, the circuit 116 of power stage 110 can allow the power stage 110 to generate a fixed value, effectively identifying or extracting an input offset voltage or a gain error that can be introduced to an output of the power stage 110 (e.g., IMON pin). The correction circuit 206 an allow the controller 102 to identify and extract input offset voltage or gain errors associated with the ADC 202. The identification of these input offset voltages and gain errors can be corrected by the PID controller 218, effectively performing auto-zero or auto-gain calibration at a system level, instead of having multiple components performing their own calibration at multiple instances. Further, each power stage connected to the controller 102 can generate the fixed values in a sequential manner, such that the controller 102 can perform the system level calibration continuously based on sequential feedback from each connected power stage. Also, the integration of multiple copies of the circuit 130 (e.g., one copy for each power stage) and the switches S1, S2, S3 in each power stages can reduce board area occupied by individual calibration circuits (e.g., auto-zero amplifiers, auto-gain amplifiers, etc.).

The filtered signal 218, upon being received by the PID controller 208, can be combined or summed with the sample current 222 being looped between the PID controller 208 and the current synthesizer 204 at a summation node 434. The summation node 434 can output a offset correction signal 435 to the offset correction circuit 432. The offset correction signal 435 can be an offset in amplitude, or voltage level, between the filtered signal 218 and the sample current 222. The offset correction circuit 430 can perform proportional integral (PI) correction on the offset correction signal 435 to generate an amplitude 224a, where the amplitude 224a can be a new amplitude or voltage level of the sample current 222. The current synthesizer 204 can receive the slope 224s and the amplitude 224a. The current synthesizer 204 can generate the adjusted synthetic current 224 based on the slope 224s and the amplitude 224a, such that the adjusted synthetic current 224 can be a corrected or adjusted version of the sample current 222 having the slope value indicated by the slope 224s and amplitudes indicated by the amplitude 224a.

In an example, in response to the switched S4, S5 in the correction circuit 206 being switched off, the circuit 130a may operate under a normal operation mode. For example, the digital signals 216 can be sampled from the sensed signal 118 representing sensed current or sensed voltage measures from the output of the power stage 110. The PID controller 208 can correct or adjust the sample current 222 using the sensed signal 118. For example, the slope calculation circuit 420 can determine a slope 216s of the digital signals 216, and the slope 216s can be used for generating the slope correction signal 437. Therefore, the integration of the switches S4, S5 in the correction circuit 206 may not interfere with normal operations of the system 100 (see FIG. 1).

Figure 5:
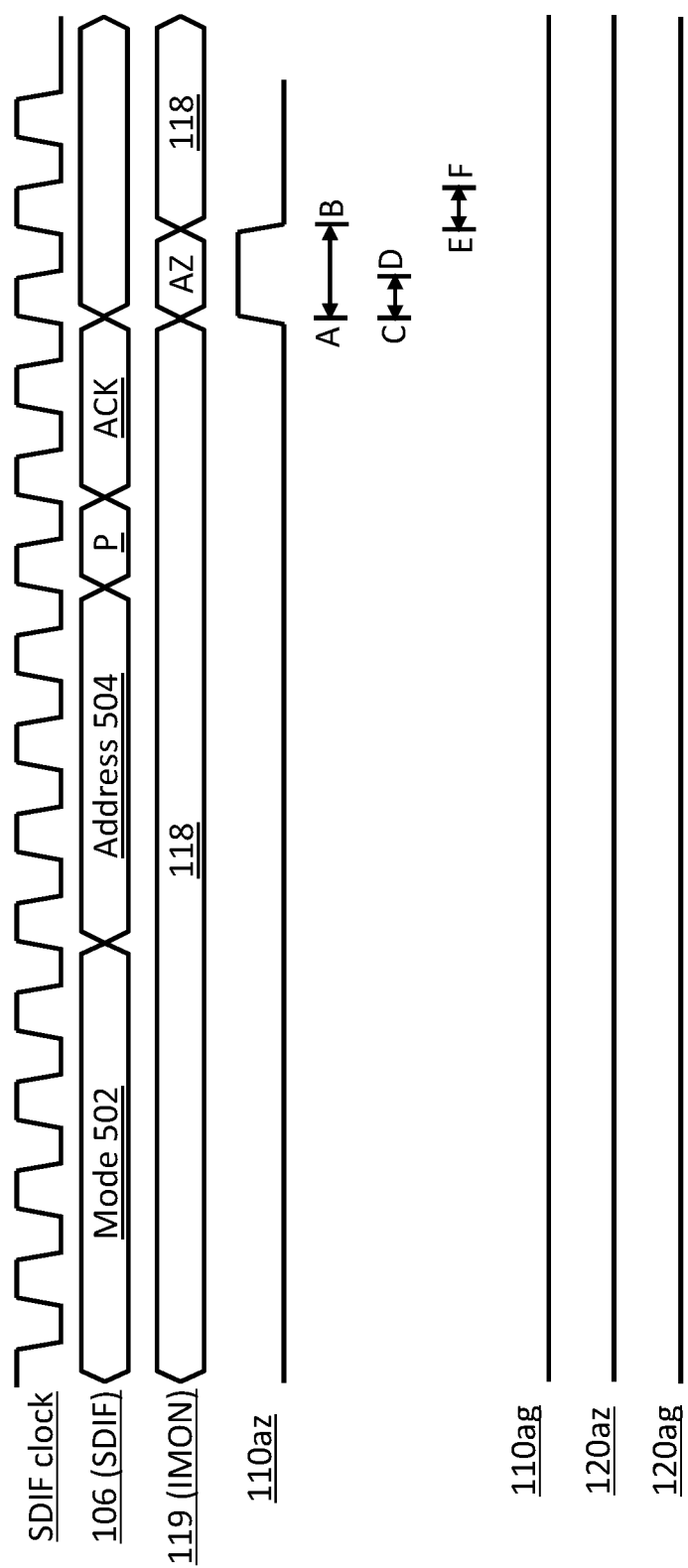
FIG. 5 is a diagram showing a timing diagram of another example implementation of system level offset calibration of multiphase voltage regulator in one embodiment.

FIG. 5 is a diagram showing a timing diagram of another example implementation of system level offset calibration of multiphase voltage regulator in one embodiment. The command 106 can be issued by a firmware of the controller 102 via the SDIF interface. A clock signal, labeled as SDIF clock, can control the timing of the command 106 and switching between normal operating modes and auto-zero or auto gain calibration modes of the power stages 110, 120. In the example shown in FIG. 5, the command 106 can be a data packet including a mode 502, an address 504, one or more parity bits labeled as P, and an acknowledgement labeled as ACK. The mode 502 can be a value indicating one of a normal operating mode, an auto-zero mode, and an auto-gain mode. The address 504 can be an address of a power stage connected to the controller 102. Each one of the power stages 110, 120 can be configured to read the address 504 in order to determine whether to operate in a normal operating mode, an auto-zero mode, and an auto-gain mode, according to the value indicated by the mode 502.

In the example shown in FIG. 5, the power stages 110 and 120 can receive the command 106 via their SDIF pin. A signal 110az can control the switch S2 in the power stage 110 and a signal 110ag can control the switch S3 in the power stage 110 (see FIG. 2). A signal 120az can control the switch S2 in the power stage 120 and a signal 120ag can control the switch S3 in the power stage 120. In response to the mode 502 indicating an auto-zero mode, and the address 504 being an address of the power stage 110, the signal 110az can be switched to logic high at a time A to close the switch S2 of the power stage 110. The auto-zero calibration mode of the power stage 110 can be switched on when the signal 110az is logic high. The auto-zero calibration mode of the power stage 110 can stay switched on for a period of time, such as between the time A to a time B. In an example, the time from time A to time B can be approximately 500 nanoseconds (ns) to 2 microseconds (μs), or other amount of time that can be configurable.

As a result of switching on the auto-zero calibration mode of the power stage 110, the IMON pin of the power stage 110 can output a fixed value AZ (e.g., fixed value 303 in FIG. 3) between time A to time B. In other times where the signal 110az is logic low, meaning the switch S2 of the power stage 110 is switched off, the IMON pin of the power stage 110 can operate in normal operation to provide the sensed signal 118 to the controller 102. Further, when the signal 110az is logic high, the signal 110ag is logic low to prevent the auto-gain calibration mode to be switched on simultaneously with the auto-zero calibration mode in the power stage 110. Also, when the signal 110az is logic high, the signals 120az, 120ag, are logic low to prevent the power stage 120 from performing auto-zero and auto-gain calibrations simultaneously with the power stage 110. In one or more embodiments, the address 504 can include more than one power stage addresses to switch on auto-zero or auto-gain calibration modes of more than one power stages. The number of power stages to undergo auto-zero or auto-gain calibration modes can be arbitrary and can be dependent on a desired implementation of the system 100 shown in FIG. 1.

In an example, referring to FIG. 2 and FIG. 5, the current synthesizer 204 can wait for a programmable time, labeled as a time period between time C to time D in FIG. 5, for the input (e.g., feedback signal 119) to the ADC 202 to settle. Any data being received by the ADC 202 after the time D while 110az is high will be used to update the auto-zero data of the controller 102. In response to the signal 110az going from high to low, the current synthesizer 204 can wait for another programmable time, labeled as a time period between time E to time F, before resuming normal current correction operations using the sensed signal 118.

In an example, the controller 102 can sequentially switch on a calibration mode (e.g., auto-zero or auto-gain) of one power stage among multiple power stages. For example, N power stages can be connected to N copies of the circuit 130 integrated in the controller 102. The controller 102 can switch on calibration mode on a specific power stage, such that the controller 102 can receive a specific synthetic current that was corrected based on a fixed signal and receive (N−1) synthetic currents that were corrected based on sensed currents or sensed voltages. The controller 102 can analyze a combination of the specific synthetic current and the (N-1) synthetic currents to determine an amount of adjustment to be made to the duty cycle of the PWM signal 111a (see FIG. 1). The adjustment to the PWM signal 111a can cancel offsets and/or gain errors of sensed currents or sensed voltages being measured at an inductor connected to an output of the specific power stage. The controller 102 can sequentially obtain synthetic current based on calibration signals from other power stages, and continuously adjust the PWM signal 111a to balance offset and gain cancellations across multiple power stages.

Figure 6:
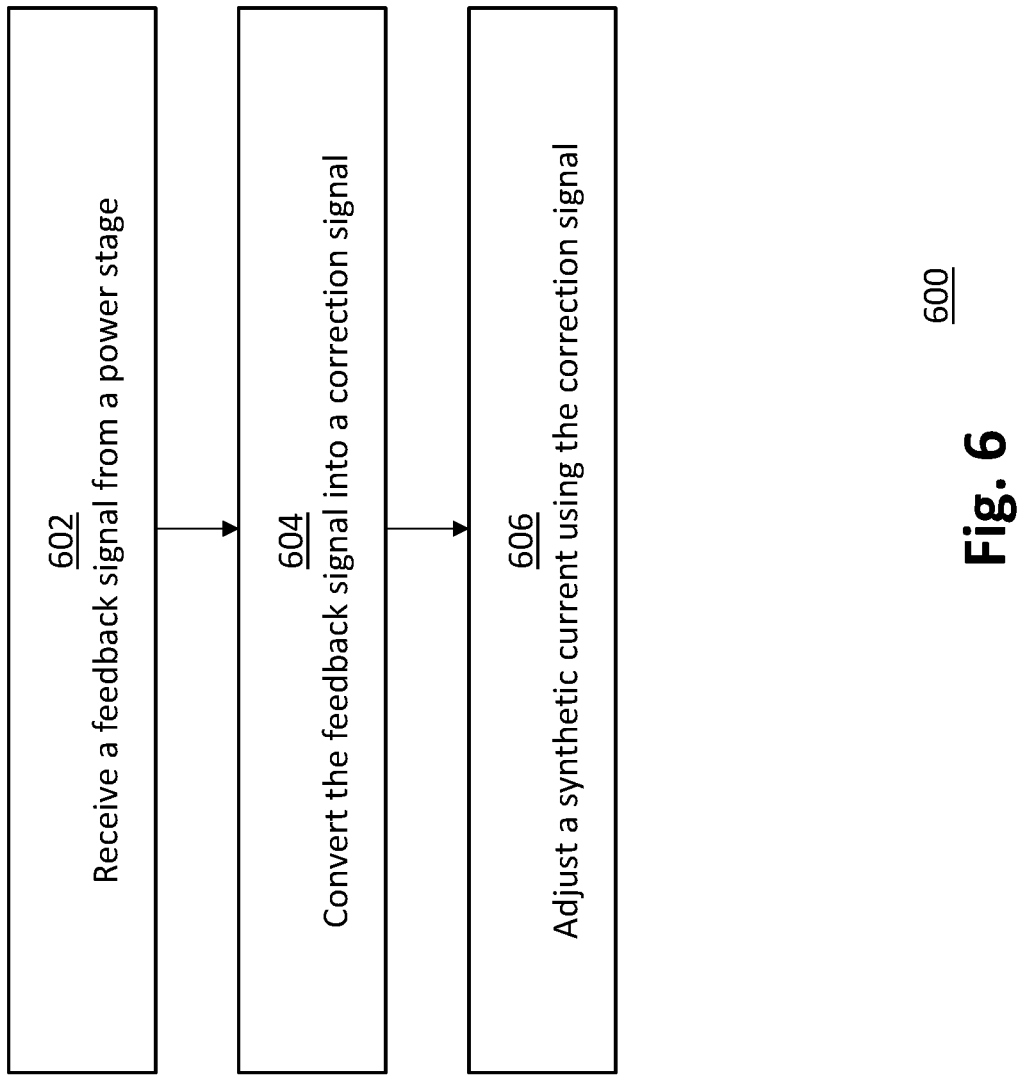
FIG. 6 is a flow diagram illustrating a process to implement system level offset calibration of multiphase voltage regulator in one embodiment.

FIG. 6 is a flow diagram illustrating a process 600 to implement system level offset calibration of multiphase voltage regulator in one embodiment. The process can include one or more operations, actions, or functions as illustrated by one or more of blocks 602, 604, and/or 606. Although illustrated as discrete blocks, various blocks can be divided into additional blocks, combined into fewer blocks, eliminated, in different order, or performed in parallel, depending on the desired implementation.

The process 600 may begin at block 602. At block 602, a controller may receive a feedback signal from a power stage. The feedback signal may be one of a sensed signal measured from an output of the power stage and a calibration signal representing a fixed voltage. In one embodiment, the fixed voltage may represent one of an input offset voltage and a gain of the power stage. In response to the fixed voltage representing the input offset voltage, the correction signal may be an offset correction signal. In response to the fixed voltage representing the gain, the correction signal may be a slope correction signal.

The process 600 may proceed from block 602 to block 604. At block 604, the controller may convert the feedback signal into a correction signal. In one embodiment, in response to the feedback signal being the calibration signal representing the fixed voltage, the controller may sample the fixed voltage and use the sampled fixed voltage to generate the correction signal.

The process 600 may proceed from block 604 to block 606. At block 606, the controller may adjust a synthetic current using the correction signal, the synthetic current being associated with the power stage. In one embodiment, in response to the feedback signal being the sensed signal measured from an output of the power stage, the controller may correct the synthetic current based on the sensed signal.

In one embodiment, the controller may adjust a PWM signal of the power stage based on the adjusted synthetic current. In one embodiment, the controller may send a command to the power stage periodically to request the calibration signal. In one embodiment, the power stage may be a first power stage, the correction signal may be a first correction signal, and the synthetic current may be a first synthetic current. The controller may receive a second feedback signal from a second power stage, convert the second feedback signal into a second correction signal, and adjust a second synthetic current using the second correction signal. The second synthetic current may be associated with the second power stage.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
a controller configured to:
  receive a feedback signal from a power stage, wherein the feedback signal is one of a sensed signal measured from an output of the power stage and a calibration signal representing a fixed voltage, and the fixed voltage represents one of:
    an input offset voltage of an amplifier in the power stage that outputs the feedback signal; and
    a gain of the amplifier;
  convert the feedback signal into a correction signal; and
  adjust a synthetic current using the correction signal, the synthetic current being associated with the power stage.

2. The apparatus of claim 1, wherein the controller is configured to send a command to a power stage periodically to request the calibration signal.

3. The apparatus of claim 1, wherein the controller is configured to:
  in response to the feedback signal being the sensed signal measured from an output of the power stage, correct the synthetic current based on the sensed signal; and
  in response to the feedback signal being the calibration signal representing the fixed voltage:
    sample the fixed voltage; and
    use the sampled fixed voltage to generate the correction signal.

4. The apparatus of claim 1, wherein the controller is configured to adjust a pulse width modulation (PWM) signal of the power stage based on the adjusted synthetic current.

5. The apparatus of claim 1, wherein:
the power stage is a first power stage, the correction signal is a first correction signal, and the synthetic current is a first synthetic current;
the controller is configured to:
receive a second feedback signal from a second power stage;
convert the second feedback signal into a second correction signal; and
adjust a second synthetic current using the second correction signal, the second synthetic current being associated with the second power stage.

6. The apparatus of claim 1, wherein:
in response to the fixed voltage representing the input offset voltage of the amplifier, the correction signal is an offset correction signal; and
in response to the fixed voltage representing the gain of the amplifier, the correction signal is a slope correction signal.

7. The apparatus of claim 1, wherein the power stage is among a plurality of power stages connected to the controller.

8. An apparatus comprising:
a voltage converter;
a circuit coupled to the voltage converter, the circuit comprises an amplifier and the circuit is configured to:
receive a sensed signal from the voltage converter;
receive a command from a controller;
in response to the command being a request to switch on an amplification mode, the amplifier is configured to:
amplify the sensed signal; and
send the amplified sensed signal to the controller; and
in response to the command being a request to switch on a calibration mode, the amplifier is configured to output a fixed voltage to the controller, wherein the fixed voltage represents one of:
an input offset voltage of the amplifier; and
a gain of the amplifier.

9. The apparatus of claim 8, wherein the calibration mode is one of an auto-zero calibration mode and an auto-gain calibration mode.

10. The apparatus of claim 8, wherein the command is received by the circuit periodically.

11. The apparatus of claim 8, wherein:
the circuit comprises a first switch, a second switch, and a third switch;
the calibration mode being one of an auto-zero calibration mode and an auto-gain calibration mode; and
the circuit is configured to:
operate the first switch to switch on the amplification mode; and
operate the second switch to switch on the auto-zero calibration mode; and
operate the third switch to switch on the auto-gain calibration mode.

12. The apparatus of claim 11, wherein:
the first switch is connected between the output of the voltage converter and a non-inverting input terminal of the amplifier in the circuit;
the second switch is connected between a ground and a node between the first switch and an inverting input terminal of the amplifier in the circuit; and
the third switch is connected between a reference voltage and the node.

13. The apparatus of claim 8, wherein the command is received via a shared digital bus interface that connects the controller to a plurality of power stages, the voltage converter and the circuit being parts of a power stage among the plurality of power stages.

14. A method for operating a voltage regulator, the method comprising:
receiving, by a controller comprising hardware, an analog feedback signal from a power stage, wherein the analog feedback signal is one of a sensed signal measured from an output of the power stage and a calibration signal representing a fixed voltage, and the fixed voltage represents one of:
an input offset voltage of an amplifier in the power stage that outputs the analog feedback signal; and
a gain of the amplifier;
converting, by the controller, the analog feedback signal into a digital correction signal; and
adjusting, by the controller, a synthetic current using the digital correction signal, the synthetic current being associated with the power stage.

15. The method of claim 14, further comprising:
in response to the analog feedback signal being the sensed signal measured from an output of the power stage, correcting, by the controller, the synthetic current based on the sensed signal; and
in response to the analog feedback signal being the calibration signal representing the fixed voltage:
sampling, by the controller, the fixed voltage; and
using, by the controller, the sampled fixed voltage to generate the digital correction signal.

16. The method of claim 14, further comprising adjusting, by the controller, a PWM signal of the power stage based on the adjusted synthetic current.

17. The method of claim 14, wherein the power stage is a first power stage, the digital correction signal is a first digital correction signal, the synthetic current is a first synthetic current, and the method further comprising:
receiving, by the controller, a second analog feedback signal from a second power stage; and
converting, by the controller, the second analog feedback signal into a second digital correction signal; and
adjusting, by the controller, a second synthetic current using the second digital correction signal, the second synthetic current being associated with the second power stage.

18. The method of claim 14, wherein:
in response to the fixed voltage representing the input offset voltage, the digital correction signal is an offset correction signal; and
in response to the fixed voltage representing the gain, the digital correction signal is a slope correction signal.

19. The method of claim 14, further comprising sending, by the controller, a command to the power stage periodically to request the calibration signal.

* * * * *